United States Patent [19]

Chance

[11] 4,352,184
[45] Sep. 28, 1982

[54] GAS LASER AND METHOD OF MANUFACTURING

[75] Inventor: Dudley A. Chance, Danbury, Conn.

[73] Assignee: IBM Corporation, Armonk, N.Y.

[21] Appl. No.: 930,617

[22] Filed: Aug. 3, 1978

Related U.S. Application Data

[63] Continuation of Ser. No. 737,375, Nov. 1, 1976.

[51] Int. Cl.³ .............................................. H01S 3/03
[52] U.S. Cl. ........................................ 372/61; 372/87
[58] Field of Search .................... 331/94.5 D, 94.5 G, 331/94.5 PE, 94.5 C; 330/4.3; 29/25.13, 25.16; 372/61, 87

[56] References Cited

U.S. PATENT DOCUMENTS

| | | | |
|---|---|---|---|
| 3,815,047 | 6/1974 | Smith et al. | 331/94.5 R |
| 3,858,284 | 1/1975 | Costa et al. | 29/25.13 |
| 3,930,731 | 1/1976 | Andringa | 331/94.5 C |

*Primary Examiner*—William L. Sikes
*Attorney, Agent, or Firm*—Pollock, Vande Sande & Priddy

[57] ABSTRACT

A gas laser body, gas laser, a method of manufacture of gas laser body and a method of manufacturing a gas laser are disclosed. The gas laser body comprises a pair of glass plates with means located there between defining a plurality of communicating gas passages. One of said passages comprises a plasma tube. Electrodes may be formed by depositing metal on one or more said plates with said electrodes lying in one or more passages when said plates and means are assembled. The means may comprise another glass plate which has portions thereof cut away to form the gas passages. Alternatively the means may include one or more glass rods suitably shaped to define the gas passages when located between said first and second plates.

16 Claims, 17 Drawing Figures

GAS LASER AND METHOD OF MANUFACTURING

This is a Continuation, of application Ser. No. 737,375, filed Nov. 1, 1976.

FIELD OF THE INVENTION

The present invention relates to a novel gas laser, intermediates thereof and methods for manufacturing both the intermediates and the laser.

BACKGROUND OF THE INVENTION

Gas lasers have been described in literature as well as methods of manufacturing the same. Relatively low powered gas lasers and methods of manufacturing the same have been described by Kolb, Jr. in U.S. Pat. No. 3,495,119 and by Hochuli et al in Relative Frequency Stability of Stable He-Ne Gas Laser Structures appearing in the IEEE Journal of Quantum Electronics, December 1971, pp 573-575. More particularly the laser body comprises a glass shell enclosing a plurality of communicating gas passages. At least two electrodes are provided for exciting the gas. One of the communicating gas passages comprises a relatively narrow plasma tube through which travel electrons emitted by one electrode. The electrons ionize a portion of the atoms of the gas creating the desired discharge and energy level population inversion. By providing a suitable resonant optical cavity a device is provided for supplying the well known laser light output. Although these devices are known to the art, and have been constructed and operated there are a number of problems related to this field which the art has not, up to this time, been capable of solving.

As can be expected there has been a continual striving to increase the operating lifetime of the laser. There are two factors which are particularly important to laser lifetime. One of these relates to the gradual destruction of the electrodes through normal use. Although the reasons for this destruction are not yet well known at least one factor in the destruction of the electrodes is the presence of impurities in the electrodes. Another factor governing laser lifetime is the leakage to and from the operating medium, i.e., the gases, through the seals. The use of epoxy seals has been wide spread in the art notwithstanding the knowledge that such seals do in fact leak.

Another difficulty which the art has sought to overcome, without success, are the numerous manual steps required in the manufacturing of such a laser. Prominent among these is the requirement for glass to be blown to provide the laser bodies. Those of ordinary skill in the art will understand the advantages to be gained by limitation of manual manufacturing steps, especially steps such as glass blowing. Further advantages could accrue if the glass blowing steps could be eliminated. Because of the use of glass blowing the art has seen fit to employ Pyrex glass by reason of that materials desirable qualities for the process of blowing. However, it is difficult to select suitable materials for sealing to Pyrex to effect a hard seal. For this reason, the art has employed soft seals such as epoxy, which, as has been mentioned above, introduced the leakage problems. Thus, eliminating the blowing steps allows advantages to be obtained beyond the mere elimination of manual manufacturing steps. That is, different materials can be employed whose characteristics provide still other advantages.

Another problem introduced by the glass blowing is that blown glass does not produce identical components from every operation. This has lead to difficulty in employing jigs and other fixtures in further manufacturing steps. For instance, the Kolb, Jr. apparatus requires a plurality of glass cylinders to be joined. The fact that the cylinders are formed by blowing may lead to difficulty in employing jigs and other fixtures in the joining operation and, if the jigs or fixtures are eliminated then the step of joining the different components becomes another manual operation with its own attendant difficulties.

A still further problem in the prior art has been the mechanical stability of the final product. For effective laser operation, of course, the plasma tube should remain linear and aligned with the mirrors and windows (if employed). The fragile nature of the blown glass components has introduced instability problems in that the possibilities of bending and fracture exist. This is especially important in some laser operations where temperature variations can induce thermal stresses.

It is therefore an object of the present invention to provide a method of manufacturing a gas laser body which employs a step of depositing a metallic layer to form the electrodes. This step allows greater control over the material eventually employed as the electrode compared to prior art processes which are not able to use deposition techniques.

It is another object of the present invention to provide a method of manufacturing a gas laser body which eliminates the necessity for glass blowing.

It is another object of the present invention to provide a method of manufacturing a glass laser body which employs material capable of providing a hard seal with relatively simple manufacturing techniques.

It is another object of the present invention to provide a gas laser and a method of manufacturing a gas laser which reduces the number of manual steps required in the manufacturing operation to thereby reduce manufacturing costs.

It is still another object of the present invention to provide a gas laser with a greater degree of stability over that shown in the prior art.

SUMMARY OF THE INVENTION

The present invention achieves these and other objects of the invention by employing a pair of glass plates as two components of the gas laser body. Electrodes may be deposited by conventional deposition techniques on one or both of the glass plates. Means are provided for defining a plurality of communicating gas passages when the means are assembled between the first and second glass plates. One of the referred to gas passages is a relatively narrow passage which forms the plasma tube. At least two other gas passages are provided, each adjacent one of the electrodes. To provide a hard seal around the periphery of the laser body a suitable sealing material is provided between the plates. When assembled as described the body can then be simply completed by firing the assembly to thereby form the seal. The intermediate product thus produced is a gas laser body which has incorporated therein the necessary electrodes and a plurality of gas passages including the plasma tube. The various passages are open to the atmosphere only at the extremities of the plasma tube. The intermediate product is useful in forming a gas laser by sealing the ends of the plasma tube with windows and/or mirrors.

As an alternative the glass plates can be ground in selected locations to provide lands for Brewster windows at the extremities of the plasma tube. Before firing a tip-off is provided through one of the glass plates which can communicate with the gas passages. By assembling Brewster windows on the lands, the assembly, after firing and tip-off, is gas tight and employs only hard seals. Mirrors and mirror mounts may then be mounted adjacent to Brewster windows to thereby complete the laser.

There are a number of different means which can be employed to define a plurality of communicating gas passages when assembled between the glass plates. In one form these means can comprise suitably shaped glass spacer rods. In another form of the invention the referred to means can comprise still another glass plate which has portions thereof cut away to define the communicating gas passages.

DETAILED DESCRIPTION OF PREFERRED EMBODIMENTS

Figure 1A:
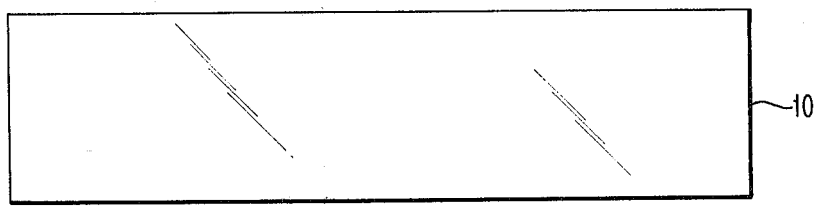
FIGS. 1A–1F illustrate top and side views of components of one embodiment of a gas laser and FIG. 1G is an isometric sectional of such assembled components.
Figure 1B:
Figure 1C:
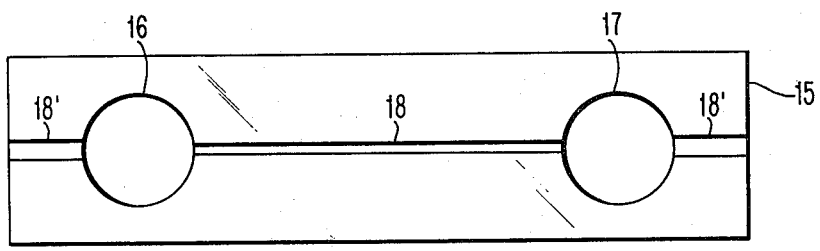
Figure 1D:
Figure 1E:
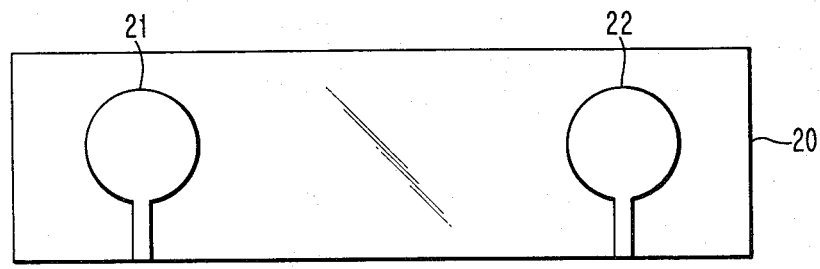
Figure 1F:
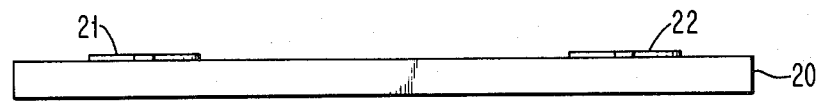
Figure 1G:
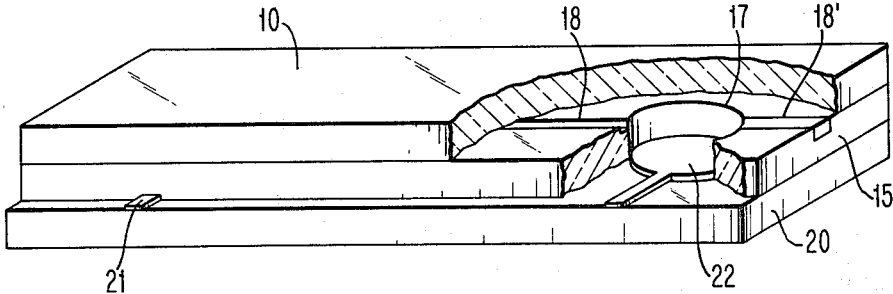

FIGS. 1A through 1G illustrate an embodiment of the invention for producing a gas laser body. FIG. 1G illustrates a section of the gas laser body in assembled form which is useful in producing a gas laser. The body of FIG. 1G comprises a pair of glass plates 10 and 20 which may comprise ordinary window glass. Located therebetween is a means 15 for defining a plurality of gas passages. FIGS. 1A through 1F show top and end views, respectively, of the three elements of the gas laser body illustrated in FIG. 1G.

More particularly, the top plate 10 is shown in top and end views in FIGS. 1A and 1B as a rectangular parallelepiped having length, width and thickness.

FIGS. 1C and 1D show top and end views, respectively, of the means for defining a plurality of gas passages. In this embodiment, this means 15 comprises another plate of the same material which has a portion thereof removed in the shape of a pair of cylinders 16 and 17 and a rectangular channel 18 which is cut into one surface of the means 15 intersecting both cylinders 16 and 17. The cylinders 16 and 17 and the groove 18 define a plurality of communicating gas passages.

As is shown in FIG. 1C and 1D the channel 18, which will form a plasma tube, is smaller in cross-section than the continuations 18' of the channel. The portions 18' of the channel are preferably larger in cross-section so that no portion of the optical path of the laser beam is attenuated.

FIGS. 1E and 1F illustrate, respectively, a top and side views of the bottom plate 20 of the gas laser body.

The plate 20 is similar to the top plate except that a pair of electrodes 21 and 22 have been deposited thereon. Electrodes 21 and 22 may be deposited using conventional deposition tehniques and may comprise a suitable material for a gas laser electrode, such as aluminum. Electrodes 21 and 22 are provided in a form commensurate with the gas passages 16 and 17.

Although plate 20 is similar in form to plates 10 and 15 it is wider so that when the plates are assembled as illustrated in FIG. 1G the electrodes 21 and 22 are available for external connection.

Manufacturing the gas laser body illustrated in FIG. 1G requires preparation of three glass plates, such as 10, 15 and 20. Plate 15 forms the required means for defining the plurality of communicating gas passages. In addition to providing a plate of suitable dimension the gas passages 16 and 17 are provided by cutting away the above mentioned cylinders 16 and 17 and by also cutting away the communicating passage 18 in one surface of plate 15. The lower plate 20 is prepared by depositing the electrodes 21 and 22 with a suitable deposition technique in a form which is commensurate with the gas passages 16 and 17. If desired, an additional electrode, or electrodes, may be deposited on the upper plate 10. These electrodes if desired, may take the same form as those shown in FIG. 1E.

After the three plates have been prepared they can be assembled by placing them in the overlying relationship illustrated in FIG. 1G. In order to seal the communicating gas passages 16, 17 and 18 a suitable sealing material is deposited between each pair of plates at the periphery thereof. The sealing material, of course, is not placed so as to block the extremities of the slot 18 at the respective ends of the plate 15. One suitable sealing material is a sealing glass such as that manufactured by Owens-Illinois, SG-67 or the Corning Seal Glass, C-7570.

After assembling the plates and depositing the sealing material the assembly may be fired in a furnace. I have found that with the materials referred to above a suitable firing temperature is 485° C., for 10–20 minutes, although a temperature in the range 460°–485° C. may be used.

The resulting product, illustrated in FIG. 1G, provides a useful intermediate in the manufacture of a gas laser. In particular, by filling the gas passages with a suitable gas lasing medium and sealing the body with a pair of mirrors at the extremities 18' of the slot 18 a functional laser is provided. The mirrors may be sealed to the plasma tube by first grinding the edge of the body to specified tolerances. The mirrors may be attached by a gold-indium seal as used by Hochuli, by low temperature glasses or by an epoxy method. The gas fill may be accomplished during the mirror attach process or by a typical tip-off tube previously sealed into the glass plate.

The embodiment of the invention illustrated in FIGS. 2A through 2D allows a single firing to provide a sealed gas laser body which merely requires filling with a gaseous medium and the attachment of mirrors to produce a laser.

Figure 2A:
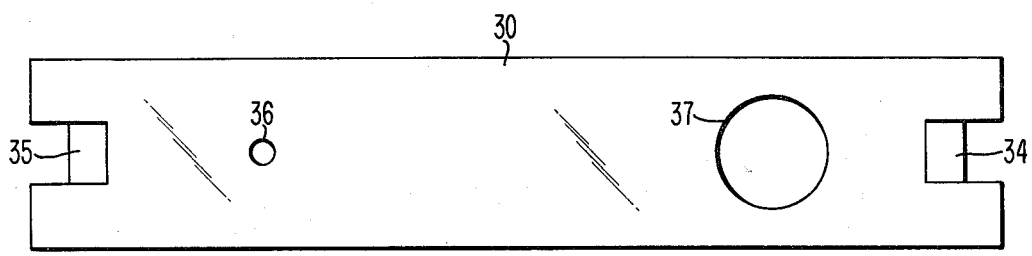
FIGS. 2A–2C illustrate top views of components of another embodiment of my invention and FIG. 2D is a sectional view of an assembled laser.
Figure 2B:
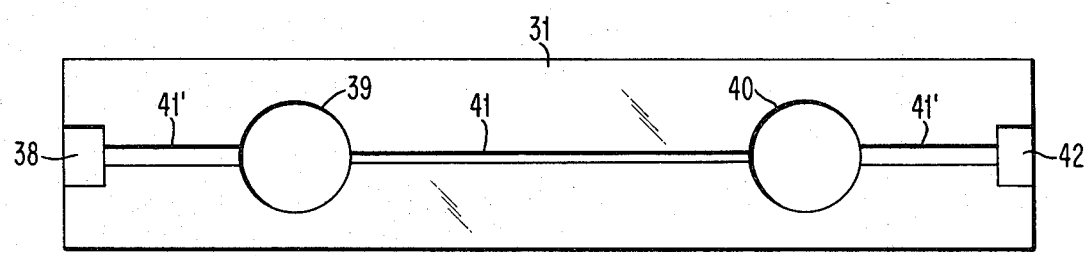
Figure 2C:
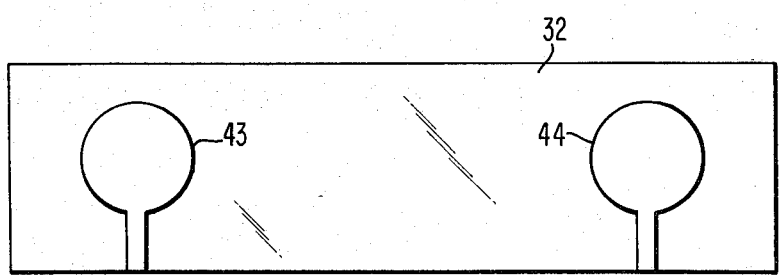
Figure 2D:
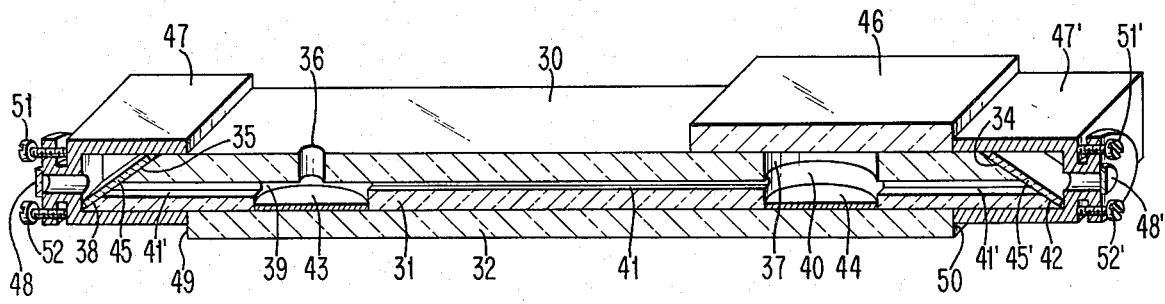

A cross-section of the completed laser is illustrated in FIG. 2D. A laser body comprises a plurality of glass plates 30, 31, 32 and 46. A top glass plate 30 has a tip-off entry 36 comprising a hole cut therein of appropriate size. A portion of one of the communicating gas passages is partially defined by cutting away at 37 material from the top plate 30. Glass plate 31 has suitable portions cut away defining a plurality of communicating gas passages. In particular, a cylindrical hole 39, another cylindrical hole 40 and a rectangular passage 41 are cut away from the plate 31 to provide such passages.

The ends of the plate 30 and 31 are ground to form lands, 35, 34, 42, 41, for Brewster windows 45. A lower plate 32 which has electrodes 43 and 44 deposited thereon forms the bottom of the laser. An additional upper plate 46 of reduced dimension is provided to complete the major components of the laser body. Mirror mounts 47 and 47' (one at the left, the other at the right) slip over the ends of the laser adjacent to Brewster windows 45 to support mirrors 48 at each end thereof. Before further describing this embodiment we will describe the major components thereof which are illustrated in FIGS. 2A through 2C.

FIG. 2A illustrates an upper plate 30 which has cylindrical holes 36 and 37 cut therethrough. The hole 36 forms the tip-off entry and the hole 37 partially defines one of the communicating gas passages of the laser body. A pair of lands 34 and 35 are ground in two of the parallel edges of the plate 30. These lands 34 and 35 will comprise a portion of the supporting structure for a pair of Brewster windowns which will be used to seal the plasma tube. This plate 30 may comprise ordinary window glass.

Means for defining a plurality of gas passages includes a plate 31 which is illustrated in FIG. 2B. This plate has dimensions which are commensurate with the dimensions of the plate 30. Cut away from plate 31 is a cylindrical hole 39, and a similar cylindrical hole 40. Communicating with these holes is a rectangular slot 41 which may be cut into one surface of the plate 31. Slots 41' are cut into the end portions of plate 31 and are, in effect, a continuation of slot 41. Slots 41' have a larger cross-section area than that of slot 41 so that no portion of the optical path of the laser beam is attenuated. Adjacent the extreme ends of slots 41' a pair of lands 38 and 42 (See FIG. 2B) are provided. These lands are ground from the plate at an angle to the upper surface of the plate 31 which is equal to the angle at which lands 34 and 35 are cut. When assembled with plate 30 overlying and directly adjacent plate 31 the lands 35 and 38 form an essentially planar land to support a Brewster window. Similarly, when so assembled the lands 34 and 42 cooperate to provide an essentially planar surface for supporting a Brewster window 45 (45'), window 45 is shown at the left, window 45' is shown at the right.

A lower plate 32 is illustrated in FIG. 2C. This plate has a thickness dimension which is similar to those for the plates 30 and 31. However, the length of the plate 32 is preferably less then the length of the plate 30 and 31 for reasons which will appear hereinafter. In addition the width of plate 32 is preferably greater than the width of plates 30 and 31 for ease in connecting to the electrodes. A pair of electrodes 43 and 44 are deposited on the plate 32 using conventional deposition techniques. The material of the electrodes 43 and 44 may be any material which is suitable for forming an laser electrode. One suitable material is aluminum. The shape and location of the electrodes 43 and 44 are chosen so that they lie in the gas passages formed by the cylinders 39 and 40 when the structure is assembled.

As is illustrated in FIG. 2D a fourth plate 46 overlies the gas passage defined by the holes 37 and 40. This plate 46 may also be provided with an electrode if desired. The arrangement illustrated in FIG. 2D employing four plates, in place of the three plates illustrated in FIGS. 1A through 1G, allows the gas passage defined by holes 37 and 40 to comprise a greater volume and therefore contain a greater quantity of gas than would be the case if the plate 30 did not have the hole 37 cut therein. Those of ordinary skill in the art will understand that eliminating the hole 37 and thus the necessity for the plate 46 is feasible if the additional volume capacity is not required.

Since the longitudinal dimension of the lower plate 32 is less than the longitudinal extent of the other plates 30 and 31 the mirror mounts 47 (47'), one mount 47 illustrated at the left, the other mount 47' shown at the right when slipped over the edges of the plates 30 and 31 can be located using the edges 49 and 50 of the plate 32. It is within the scope of my invention to provide the plate 32 with a longitudinal dimension commensurate with that of the plate 31 or 30. In this case, of course, the thickness of the mirror mounts 47 would have to be increased to accommodate the additional thickness of the plate 32.

As is shown in FIG. 2D, the mirror mount 47 (at the left) fits about the upper and lower surfaces, respectively, of plates 30 and 31, and is located by the edges 49 and 50 of the plate 32 and, if available, an edge of the plate 46. The mirror mount, per se, comprises a generally U-shaped structure which can be fabricated out of metal. The function of the mirror mount 47 is merely to support a mirror 48 so that it is colinear with the plasma tube 41. If desired, adjusting screws 51 and 52 may be provided to vary the angular relationship between the mirror 48 and the plasma tube 41. Similar remarks apply to the mount 47', mirror 48', and screws 51' and 52', as shown at the right.

In manufacturing the laser illustrated in FIG. 2D a glass plate of suitable dimensions has the lands 34 and 35 ground therein and the cylindrical holes 36 and 37 cut therein. As has been mentioned above, the hole 37 may be dispensed with if the volume enclosed thereby is not needed. Also, the hole 36 which will form the tip-off entry may be eliminated if alternative provisions for gas filling are made. These provisions may include a tip-off entry at another location or other means to provide for the introduction for the lasing medium.

Plate 31 comprises the means for defining a plurality of communicating gas passages. The plate 31 may have dimensions commensurate with that of plate 30 and has the lands 38 and 42 ground therein. A tube 41 having any convenient geometric cross-section, is ground or cut from one of the surfaces of the plate 31 to extend between the lands 38 and 42. Intersecting the tube 41 are a pair of cylinders 39 and 40 that are cut completely through the plate 31 from one surface to the opposing parallel surface.

The lower plate 32 is prepared by depositing electrodes 43 and 44 thereon in a location and with a shape which may be commensurate with the gas passages formed by assembling plates 30, 31 and 32.

When the above referred to plates have been prepared, as well as the plate 46, if desired, the plates are assembled as shown in FIG. 2D and a pair of windows 45 are placed on the lands 34–42 and 35–38. The window material is well-known in the art and may in fact comprise the same material as that of the plates. Sealing material may then be located between pairs of adjacent plates about a periphery thereof and about the periphery of the Brewster windows. The sealing material may be the same sealing material referred to above. By firing the assembly a laser body is provided which includes a plurality of communicating gas passages including a plasma tube 41. After firing only the tip-off entry 36 provides a communicating path from the gas passages to the atmosphere. It should also be apparent to those skilled in the art that the mounting of mirrors does not require the mirrors to seal any portion of the gas passages and thus the mirrors need not be formed of a material which is suitable to withstand a relatively high firing temperature of approximately 485° C. The resulting structure employs only hard seals and obviates the necessity for using an epoxy seal or low temperature glasses. Furthermore, no glass blowing is required and, accordingly, the body may be formed essentially of window glass thus allowing a wider range of sealing material to be chosen.

Thus far the embodiments discussed have employed a means for defining a plurality of communicating gas passages which comprises a plate which has portions thereof cut away to form the communicating gas passages. The embodiment illustrated in 3A through 3D does not employ such a means but instead employs a means for defining a plurality of communicating gas passages which is formed by suitably shaped glass spacer rods.

Figure 3A:
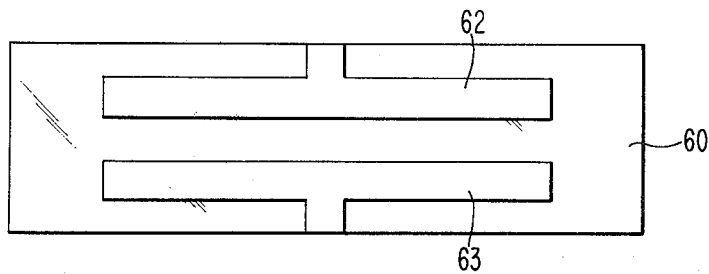
FIGS. 3A–3C illustrate top views of a component of still another embodiment of my invention in various stages of manufacture and FIG. 3D is a cross-section of an assembled components.
Figure 3B:
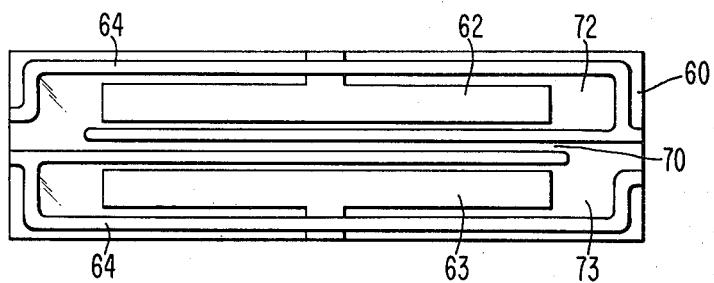
Figure 3C:
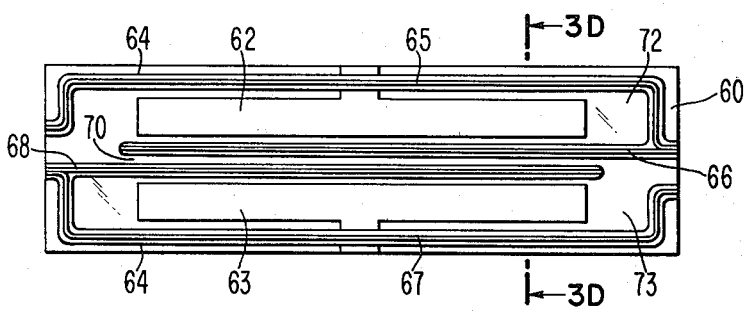
Figure 3D:
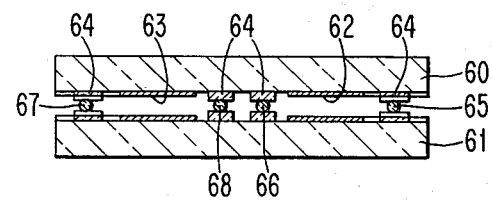

A cross-section of that laser body is illustrated in FIG. 3D and it comprises a pair of plates 60 and 61.

A top view of plate 60 is illustrated in FIG. 3A and it shows a pair of electrodes deposited thereon comprising electrodes 62 and 63.

As shown in FIG. 3B a glass frit pattern 64 has been deposited onto the plate 60. The glass frit pattern 64 defines a plurality of communicating gas passages 70, which will form the plasma tube, 72 associated with one electrode 62, and 73 associated with the other electrode 63. As shown in FIGS. 3C a plurality of suitably formed glass rods 65–68 are deposited above the glass frit pattern 64. The rods 65 and 67 define the outer boundaries of the gas passages and the rods 66 and 68 define the plasma tube which is located there between. More particularly, the area encompassed between the rods 66 and 64 forms one gas passage 72 associated with one electrode 62. The area between rods 67 and 68 forms another gas passage 73 associated with the electrode 63. Finally, the relatively small area between parallel rods 66 and 68 forms the plasma tube. Since the rods 66 and 68 are not coextensive with the longitudinal dimension of the plate 60 each of the previously defined gas passages communicates with the others.

In one form of this embodiment the final assembly is illustrated in cross-section in FIG. 3D. In this embodiment the plate 61 is formed in a manner similar to the plate 60 so that there are pairs of electrodes 62 and 63. Those of ordinary skill in the art understand that it may not be necessary to provide pairs of electrodes 62 and 63 and a single electrode 62 and 63 may be sufficient.

Figure 3E:
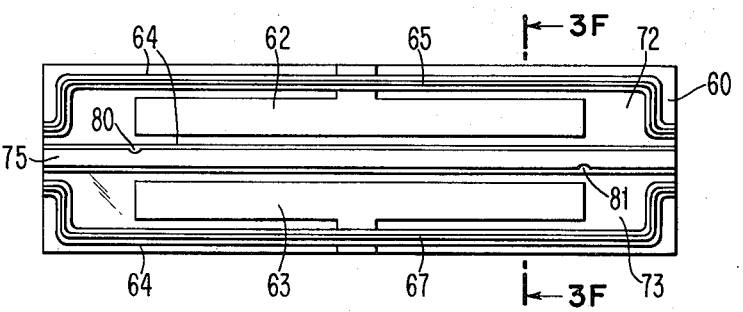
FIGS. 3E and 3F are a top and cross-section respectively, of portions of still further embodiment.
Figure 3F:
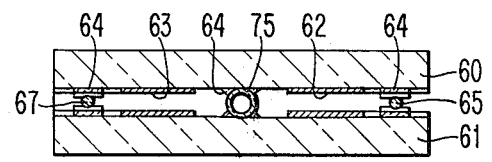

FIG. 3E illustrates still another form of this embodiment in which the glass rods 66 and 68 have been eliminated in favor of a bore tube 75. A similar cross-section is shown in FIG. 3F.

In order to provide for communication between the gas passages the bore tube 75 may be blown at 80 and 81. This may comprise a small hole formed in any convenient manner, to allow free passage of the gas but at the same time confine the discharge in the tube 75.

After depositing the electrodes and the frit, or other sealing material, and providing the spacer rods and/or bore tube, the entire assembly is fired so that the communicating gas passages 70, 72 and 73 are opened to the atmosphere only at the extreme ends of the plasma tube. This laser body may be formed into a laser by the introduction of a suitable lasing material and the sealing thereof with mirrors at each extremity of the plasma tube 70.

In one form of the invention which has been constucted in accordance with the embodiment of FIG. 2 a 0.7 milliwatt laser was constructed. The plasma tube between the adjacent cylinders 39 and 40 was approximately 8–10 centimeters in length, and the overall length of each plate 30 or 31 is approximately 25 centimeters. The cross-sectional area of plasma tube 41 itself was 48 mils by 48 mils.

The sealing material as well as spacer rods (if employed) desirably have thermal coefficients equal to the coefficient of the plates or sufficiently close thereto to avoid undue thermal stresses. A typical thermal coefficient for the material of the plates is $92 \times 10^{-7}$ cm/°C. cm and thermal coefficient in the range $80–95 \times 10^{-7}$ cm/°C. cm would be suitable.

When a proper sealing material is used relative to the body material the firing process will not result in cracks or unduly high thermal stresses which could impair the usefulness of the body.

I claim:

1. In a longitudinally excited gas laser, the improvement comprising a laser body including:
    a plurality of communicating gas passages including a plasma tube,
    at least a pair of electrodes and a pair of mirrors, said plasma tube located between said electrodes and colinear with said mirrors and wherein
    said electrodes comprise metallized layers deposited on a portion of said body.

2. The gas laser improvement of claim 1 wherein said body comprises an assembly of glass plates with said plasma tube comprising a passage cut into at least one of said plates.

3. The apparatus of claim 2 in which said body comprises at least three glass plates, a first plate with at least one electrode deposited thereon, a second plate with said plasma tube cut therein, said second plate further including a pair of holes therein communicating with said plasma tube, said holes comprising a pair of said passages and located at said electrodes.

4. The gas laser improvement of claim 1 wherein said body comprises a pair of glass plates and said plasma tube comprises a pair of glass rods and portions of said pair of glass plates.

5. The apparatus of claim 4 which further includes a spacer rod means for forming at least a pair of said passages located between said pair of plates.

6. The gas laser improvement of claim 1 wherein said body comprises a pair of glass plates and said plasma tube comprises a hollow tube contained between said plates.

7. In a longitudinally excited gas laser, the improvement comprising a laser body comprising:
    a pair of glass plates each having length, width and thickness,
    means, located between said plates, for forming a plurality of communicating gas passages therebetween, one of said gas passages comprising a plasma tube, and
    a pair of electrodes located on said glass plates, each of said electrodes lying within a different one of said passages.

8. The improvement of claim 7 wherein said means comprises a further plate having a slot cut therein comprising said plasma tube and a plurality of further portions cut away to form gas passages communicating with said slot.

9. The improvement of claim 7 wherein said means comprises a plurality of glass spacer rods arranged to form at least two gas passages, each including a different one of said electrodes, and a further passage, communicating with both said two gas passages and comprising said plasma tube.

10. A method of manufacturing a longitudinally excited gas laser which eliminates any necessity for blowing glass comprising the steps of:
   (a) providing at least a pair of glass plates;
   (b) providing a pair of electrodes on said plates;
   (c) fabricating a means for defining a plurality of gas passages and a plasma tube communicating with each said passage, including the steps of:
      (i) providing a plurality of glass rods shaped so as to define said plurality of gas passages when located between said pair of glass plates, and
      (ii) locating said glass rods between said glass plates,
   (d) assembling said means between said first and second plates to place an electrode in a different one of said gas passages, and
   (e) sealing said assembly.

11. The method of claim 10 which includes the steps of:
   (iii) providing a further pair of parallel glass rods, and
   (iv) locating said further pair of glass rods between said glass plates to form said plasma tube communicating with said plurality of gas passages.

12. The method of claim 10 which includes the steps of:
   (iii) providing a hollow tube to act as a plasma tube, and
   (iv) locating said hollow tube between said glass plates so that said hollow tube communicates with said gas passages.

13. A method of manufacturing a longitudinally excited gas laser which eliminates any necessity for blowing glass comprising the steps of:
   (a) providing at least a pair of glass plates;
   (b) providing a pair of electrodes on said glass plates by depositing electrodes on said plates;
   (c) fabricating a means for defining a plurality of gas passages and a plasma tube communicating with each said passage;
   (d) assembling said means between said first and second plates to place an electrode in a different one of said gas passages, and
   (e) sealing said assembly.

14. A method of claim 13 in which said step (a) includes the step of:
   providing lands for windows on at least one of said glass plates.

15. The method of claim 14 which includes the further step, prior to sealing said assembly, of:
   assembling windows on said plates.

16. The method of claim 15 for providing a laser which includes mirrors without requiring said mirrors to provide a portion of a gas seal which includes the further step of:
   providing a pair of mirrors and supporting each said mirror adjacent a different one of said windows.

* * * * *

UNITED STATES PATENT AND TRADEMARK OFFICE
CERTIFICATE OF CORRECTION

PATENT NO. : 4,352,184

DATED : September 28, 1982

INVENTOR(S) : Dudley A. Chance

It is certified that error appears in the above—identified patent and that said Letters Patent is hereby corrected as shown below:

On the title page:

In the Title, add -Flat Plate- before "Gas".

At Column 7, line 39, change "64" to -65-.

Signed and Sealed this

Thirtieth Day of November 1982

[SEAL]

Attest:

Attesting Officer

GERALD J. MOSSINGHOFF

Commissioner of Patents and Trademarks